United States Patent [19]

Yamazaki et al.

[11] Patent Number: 4,951,381
[45] Date of Patent: Aug. 28, 1990

[54] METHOD OF MANUFACTURING A MAGNETIC HEAD SLIDER

[75] Inventors: Koji Yamazaki; Shinichi Okuyama; Kazuhiko Watanuki; Ken Toyoshima, all of Nagaoka, Japan

[73] Assignee: Alps Electric Co., Ltd., Tokyo, Japan

[21] Appl. No.: 416,215

[22] Filed: Oct. 2, 1989

[30] Foreign Application Priority Data

Oct. 3, 1988 [JP] Japan .................................. 63-249412
Oct. 3, 1988 [JP] Japan .................................. 63-249414

[51] Int. Cl.$^5$ .............................................. G11B 5/42
[52] U.S. Cl. ...................................... 29/603; 264/345; 360/103
[58] Field of Search .................. 29/603; 264/345, 349; 360/102, 103, 128, 129

[56] References Cited

U.S. PATENT DOCUMENTS 4,327,387 4/1982 Plotto .
4,675,988 6/1987 Matsuzawa .

Primary Examiner—Carl E. Hall
Attorney, Agent, or Firm—Guy W. Shoup; David W. Heid

[57] ABSTRACT

There is provided a method of manufacturing magnetic head sliders comprising the steps of cutting a material block, which may be of sintered ferrite or ceramic material, to form a core block and slider block. A groove is formed in the core block, which is bonded to the slider block using techniques to provide a magnetic gap. Thereafter the core block is machined to form a plurality of head cores, followed by machining the slider block to form in parallel a number of sliders, which are lapped and then sliced into individual magnetic head sliders. To prevent particles of material from the magnetic head sliders from separating from the sliders and causing deleterious effects, such as head crashes, a heat treating process is employed in which the slider block and core block are treated for from 3 to 20 hours at a temperature of from 100° C. to 150° C., at an ambient air pressure of from 1.5 to 5 kg/cm$^2$ and at a relative humidity of not less than 60%. In one embodiment the heat treatment is performed immediately following the step of cutting the material to form the core block and slider block. In another embodiment, the heat treatment is performed immediately prior to lapping the sliders.

21 Claims, 4 Drawing Sheets

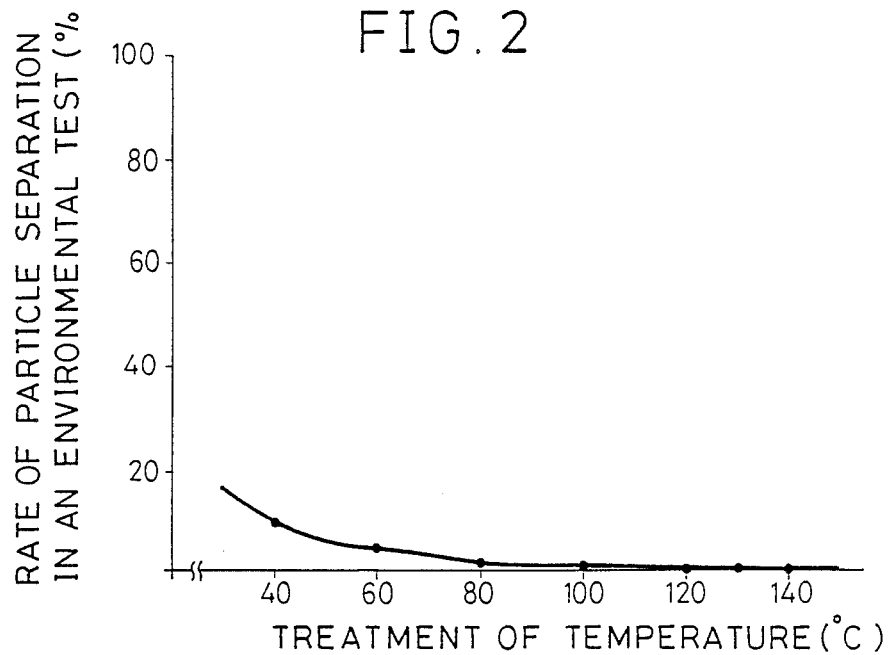
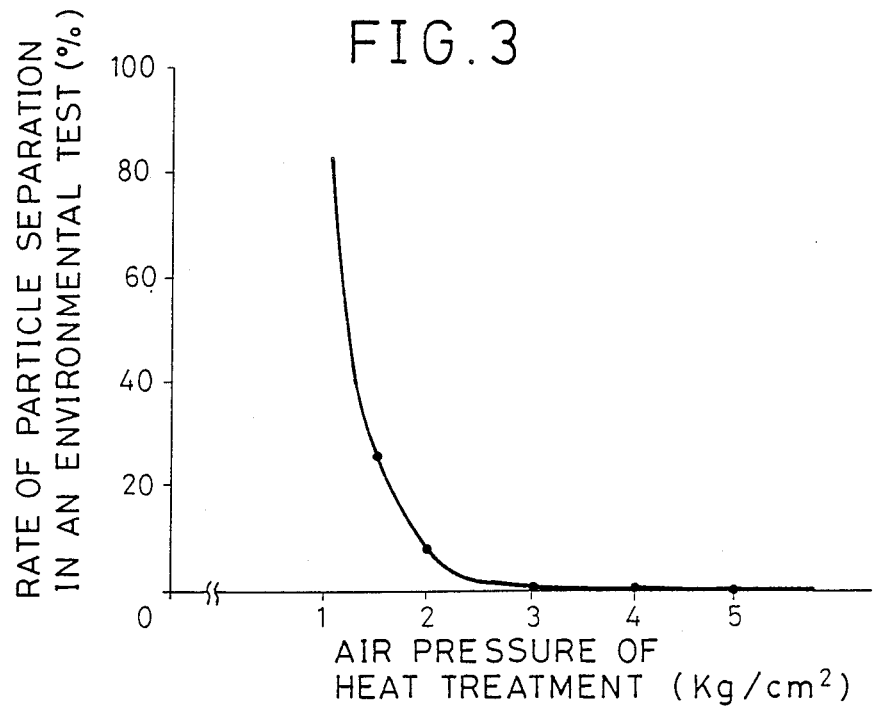

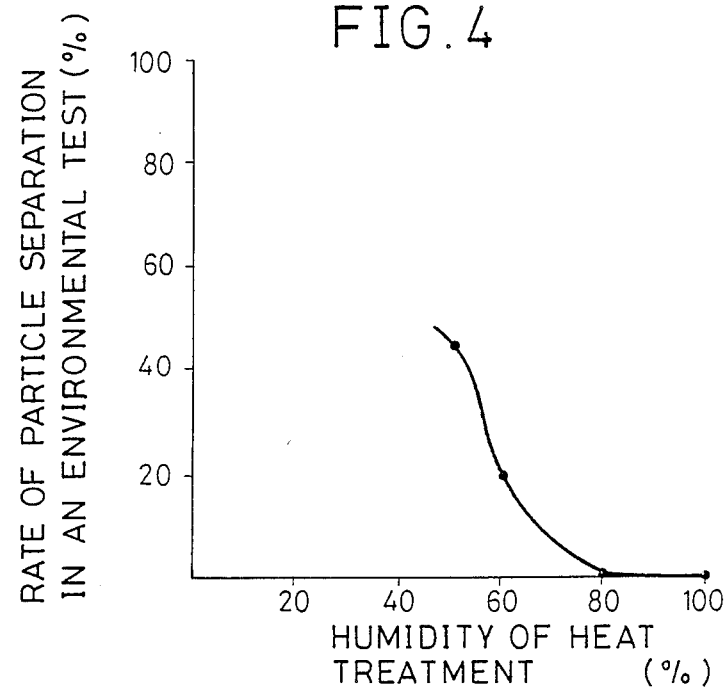
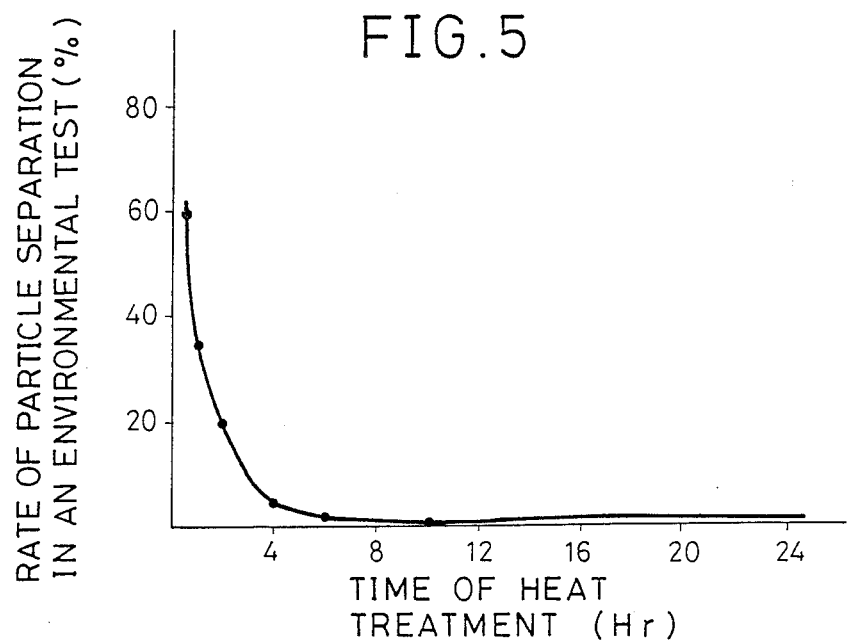

METHOD OF MANUFACTURING A MAGNETIC HEAD SLIDER

BACKGROUND OF THE INVENTION

1. Field of the Invention

This invention relates to a magnetic head slider to be used for a suspendible magnetic head assembly for conducting magnetic recording and reproducing operations on magnetic discs.

2. Description of the Prior Art

Monolithic type suspendible magnetic head assemblies prepared by using sintered ferrite such as Mn—Zn ferrite for head cores and sliders have been widely used for magnetic recording and reproducing operations.

A monolithic type magnetic head assembly is normally prepared in the following manner. A material block made of sintered ferrite such as Mn—Zn ferrite is machined to form a flat slider block and a head core block having a U-shaped section. A side of the slider block is glass cemented to the head core block. Thereafter, the head core block is notched at a predetermined regular interval along the cemented surface of the slider block to form a number of head cores having a predetermined width that corresponds to said interval. Then, a number of negative pressure grooves are formed along the cemented surface of the head cores on the side of the slider block that comes to face a rigid disc with a view of increasing the suspendibility of the head cores. The surface of the slider block is then lapped to reduce the coarseness of the surface. The slider block is sliced along the direction perpendicular to the cemented surface of each of the head cores by using a grindstone with a granularity between No. 400 and 800 to obtain a number of sliders. Finally, a plurality of monolithic type magnetic head assemblies are formed by chamfering the edges of each slider surface and those of each head core into a predetermined pattern.

A magnetic head prepared by the prior art as described above is accompanied by a drawback. The particles on the top layer of the slider can easily come off since the slider, as well as the head core, is prepared by sintering a powdery ferrite material. When the separated particles attach to a magnetic disc or a magnetic medium for information storage, a head crash phenomenon can occur, destroying the magnetic layer on the surface of the disc as some of separated particles are held in the space between the magnetic head and the magnetic disc. Solutions for the problem of head crash have been sought for some time since such phenomena can occur frequently as the recording track is narrowed and, accordingly, the height of the suspended magnetic head is reduced to achieve a high density recording.

Therefore, it is the object of the present invention to provide a method of manufacturing a magnetic head slider that can effectively prevent separation of particles from the top layer of the slider.

SUMMARY OF THE INVENTION

According to the invention, the above object is achieved by a method of manufacturing a magnetic head slider comprising a step of machining in parallel a number of sliders formed by cutting a slider block made of ceramic block material and a step of cutting said slider to produce a plurality of magnetic head sliders, wherein said slider block is heat treated for 3 to 20 hours under a condition of temperature of 100° to 150° C., atmospheric pressure of 1.5 to 5 kg/cm$^2$ and relative humidity of equal to or greater than 60%.

In a preferred embodiment of the present invention, a slider block is cut by using a grindstone having a granularity of No. 1,000 to 3,000 which is revolved with a running speed of its outer periphery of 3,000 to 10,000 m/min.

BRIEF DESCRIPTION OF THE DRAWINGS

The present invention will be described in greater detail by referring to the accompanying drawings, of which:

FIG. 2 is a graphic illustration showing the relationship between the heat treatment temperature and the rate of particle separation in an environmental test after heat treatment;

FIG. 3 is a graphic illustration showing the relationship between the ambient air pressure during heat treatment and the rate of particle separation in an environmental test after heat treatment;

FIG. 4 is a graphic illustration showing the relationship between the humidity during heat treatment and the rate of particle separation in an environmental test after heat treatment;

FIG. 5 is a graphic illustration showing the relationship between the rate of particle separation during heat and that of particle separation in an environmental test after heat treatment.

DETAILED DESCRIPTION OF THE INVENTION

Figure 1A:
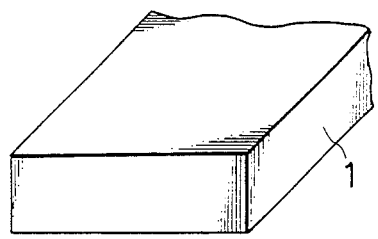
FIGS. 1(a) through 1(g) illustrates different steps of the method of manufacturing a monolithic type magnetic head according to the present invention.

The inventors of the present invention conducted various tests to determine the mechanism of particle separation from the surface layer of a slider and came to find that separation of particles from the surface layer of a slider is caused by microcracks which are formed at the time of cutting the material block and aggravated by the residual stress in the slider. Particle separation is most evident under high temperature and high humidity. In areas where moisture is found on the surface of the tip of a microcrack, hydrolysis can take place to accelerate growth of the microcrack. This is due to the sensitivity of the microcracked surface to chemical reactions.

Thus, the inventors of the present invention found that if growth of microcracks are accelerated by heat treating the slider block, the rate of particle separation after the heat treatment can be significantly reduced. A series of experiments were conducted by the inventors to determine optimum conditions for heat treatment. It was found that the rate of particle separation can be optimized when a slider block is heat treated under the condition of temperature of 100° to 150° C., atmospheric pressure of 1.5 to 5 kg/cm$^2$ and relative humidity of not less than 60%. Here the rate of particle separation is defined as 100% when one or more than one particles are separated from every 1 mm$^2$ of the surface of a slider. Thus, the rate of particle separation will be 80% when 80 particles are separated from the surface of a slider with the overall surface area of 100 mm$^2$. A particle separation rate of not greater than 20% will be required in a high humidity test for a good magnetic head slider and it should preferably have a rate of less than 5% to prove to be a reliable unit.

Now the experiments referred to above will be described in greater detail. Firstly, to see the heat treatment effects, a number of slider blocks were subjected to a high temperature/high humidity test. The specimens were heated at different degrees of high temperature for 10 hours with ambient air pressure of 3 kg/cm$^2$ and relative humidity of not less than 80%. Each specimen was observed for its rate of particle separation. FIG. 2 shows the result of the experiment, illustrating that the rate of particle separation decreases as heat treatment temperature increases until 100° C., beyond which the curve becomes flat and the rate of particle separation comes close to zero at 150° C.

Secondly, the influence of ambient air pressure at the time of heat treatment was tested by heat treating specimens under various air pressures at a temperature of 130° C. and relative humidity of not less than 80% for 10 hours and subjecting the specimens to a high temperature/high humidity test as described above. The result of the experiment is shown in FIG. 3, where the rate of particle separation dramatically drops when the air pressure for heat treatment moves from 1 kg/cm$^2$ to 2 kg/cm$^2$, evidencing that the rate of particle separation can be significantly reduced by setting the air pressure at the time of heat treatment somewhere between 1.5 kg/cm$^2$ and 5 kg/cm$^2$.

Thirdly, slider block specimens were tested for the influence of relative humidity at the time of heat treatment by subjecting the specimens to varied degrees of humidity at temperature of 130° C. and ambient air pressure of 3 kg/cm$^2$ and thereafter a high temperature/high humidity test identical with the one as described above. The result of the test is shown in FIG. 4, where the rate of particle separation decreases with increasing relative humidity, showing that the rate of particle separation can be kept significantly low if the slider block is heat treated with relative humidity greater than 60%.

Finally, the effect of duration of heat treatment was tested by subjecting specimens to heat treatment under the conditions of a temperature of 130° C., air pressure of 3 kg/cm$^2$ and relative humidity of not less than 80% for varied time durations. Thereafter, the specimens were subjected to a high temperature/high humidity environment test identical with the one as described above. FIG. 5 illustrates the result of the tests, which indicate firstly that the growth of microcracks is not sufficient when the duration of heat treatment is less than 3 hours secondly that there is no significant improvement in the rate of particle separation when the duration of heat treatment exceeds 20 hours. Therefore, particle separation can be effectively prevented by heat treating slider blocks for 3 to 20 hours under the condition of temperature of 100° to 150° C., air pressure of 1.5 to 5 kg/cm$^2$ and relative humidity of not less than 60%.

If such a heat treatment step is incorporated into the process of manufacturing a slider, it should be conducted prior to lapping the surface of the slider block since heat treatment causes degradation of the surface condition. Nevertheless, heat treatment prior to the step of lapping does not have any effect on the microcracks which are generated by the operation of cutting the slider block, leaving a risk, even if slight, of particle separation from the cutting areas of the slider block.

In view of this problem, the inventors of the present invention concentrated their efforts on prevention of particle separation from the cut areas of the slider block. The generation of microcracks can be suppressed by reducing the coarseness of the cut surfaces. More specifically the rate of particle separation can be kept within 10%, practically an ideal rate, by reducing the finished coarseness of the cut surfaces of the slider block to not greater than 1 μm·Rmax.

In search of machining parameters that can effectively satisfy the above conditions, the inventors of the present invention came to find that the finished coarseness of the cut surfaces of the slider block can be kept under 1 μm·Rmax by using a grindstone with granularity of No. 1,000 to 3,000 for a cutter and setting the running speed of the outer periphery of the grindstone to 3,000 to 10,000 m/min.

In the process of manufacturing a slider by using the present invention, the separation of particles from the top layer of the slider block is considerably accelerated because microcracks are sufficiently grown on the top layer of the slider block when it is heat treated. Therefore, there are partically no microcracks in the top layer of the slider block that can cause separation of particles after completion of the heat treatment. When the block is cut under the condition as specified above, the cut and finished surfaces of the slider will become mirror smooth and their coarseness will be kept under 1 μm·Rmax without any generation of microcracks after the heat treatment. Consequently, separation of particles from the top layer of the slider will be significantly reduced since there are partically no microcracks on the overall top layer of the slider.

Now the present invention will be described further by way of an example of preparing a monolithic type magnetic head following the process as illustrated in FIGS. 1(a) through 1(g).

According to the invention, a magnetic head is prepared from a plate-shaped material block 1, which is made of sintered ferrite. A material block can be formed in the following manner. Firstly, appropriate amounts of powdered ingredient oxides and carbonates (such as α—Fe$_2$O$_3$, Mn$_3$O$_4$, MnCO$_3$, ZnO) are prepared with a weight ratio which is proportional to the ratio of molecular components of ferrite. The powdered ingredients are mechanically mixed and heated at 900° to 1,200° C. to cause them react and form ferrite as expressed by the formulas below.

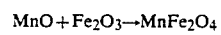

Then, the produced ferrite powder is compressed to take a required shape by applying a static pressure in an appropriately flexible vessel. The compressed powder is sintered to cause a solid phase reaction to produce agglomerated ferrite. A high density ferrite can be produced by applying a high-temperature hydrostatic press technique to compress the mixed powder. However, powdered ferrite may also be prepared through a liquid phase reaction or by using a hot press technique so that shaping and sintering are conducted simultaneously.

Figure 1B:
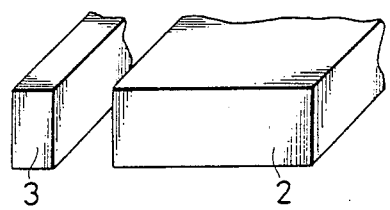
Figure 1C:
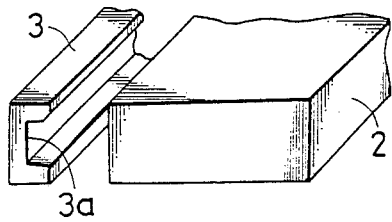
Figure 1D:
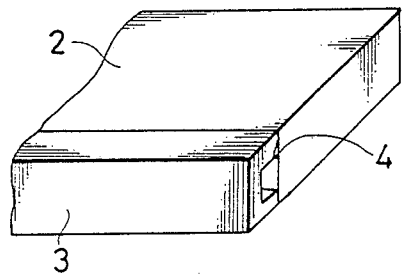

A magnetic head is produced from a material block 1 prepared as described above in the following manner. Firstly the block 1 is cut into a slider block 2 and a core block 3 by using a stone grinder having a granularlity of No. 400 to 600 as a cutter as illustrated in FIG. 1(b). Then as shown in FIG. 1(c), a groove 3a is formed on the cutting surface of the core block 3. The cut surface of the slider block 2 and that of the core block 3 are polished and at the same time a film of SiO$_2$ or a similar material is formed thereon by sputtering for formation of gaps. Then as shown in FIG. 1(d), the cut surface of the slider block 2 is brought to contact with that of the core block 3 and the surfaces are bonded together by a glass material 4. The glass material 4 to be used is a so-called low melting point glass having a melting point considerably lower than ordinary glass (such as SiO$_2$ glass) and its bonding temperature is somewhere between 300° and 500° C.

Figure 1E:
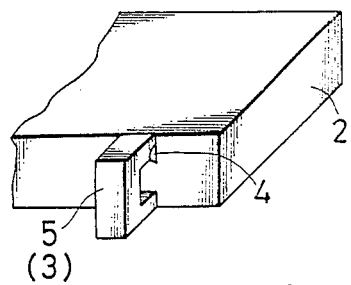
Figure 1F:
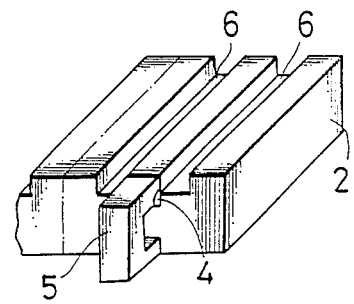

When the slider block 2 and the core block 3 are firmly bonded together, the top and bottom surfaces of the assembly are ground until the assembly comes to have a predetermined thickness. Then as illustrated in FIG. 1(e), the core block is so machined to a predetermined width forming a head core 5. Thereafter, as shown in FIG. 1(f), negative pressure grooves 6 are formed on the top of the slider block 2 in order to upwardly lift the magnetic head relative to the rigid disc that comes under it.

Figure 1G:
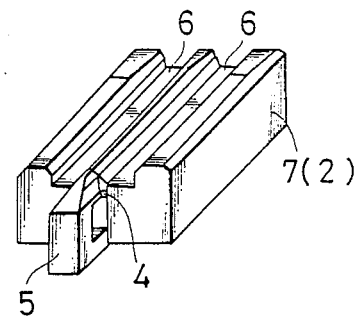
Figure 6:
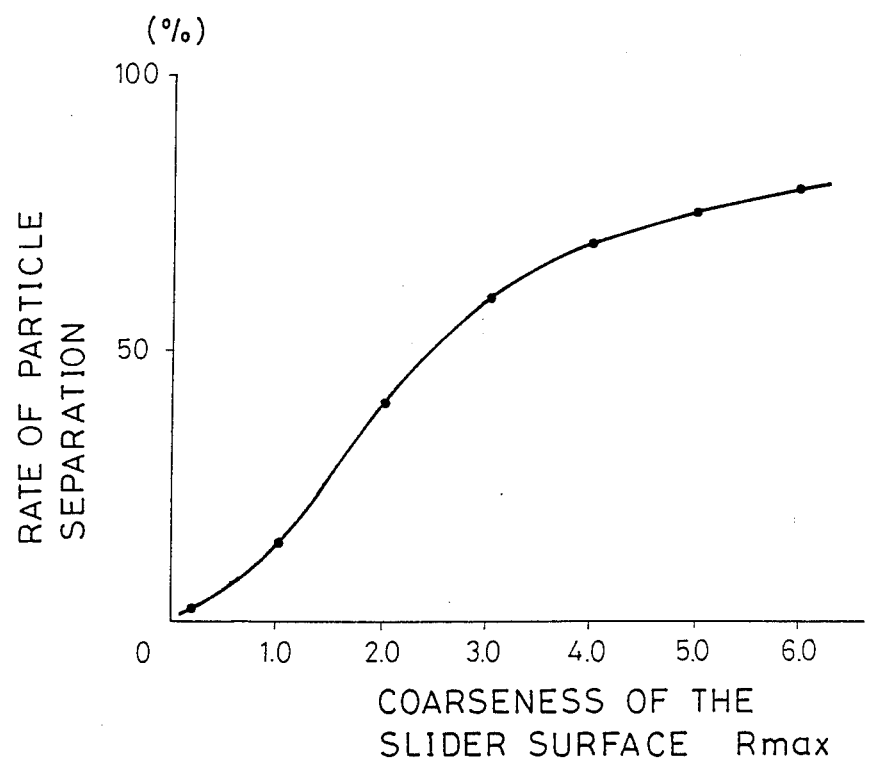
FIG. 6 is a graphic illustration showing the relationship between the coarseness of the slider surface and the rate of particle separation.

Now, the surface of the slider block 2 is lapped and then, as illustrated in FIG. 1(g), the block 2 is sliced along the surface which is bonded with the head core 5 into a number of sliders 7 having a predetermined width. Thereafter, the surface of the head core 5 and that of the slider 7 are chamfered to form a final product of a magnetic head slider having a designed configuration.

In the present example of preparing a magnetic head as described above, after forming the negative pressure grooves 6, but before lapping the surface of the slider block 2, the slider block 2 and the head core 5 are heat treated at a temperature of 133° C., air pressure of 3 kg/cm$_2$ and relative humidity of 100% for 10 hours. A grindstone having a granularity of No. 2,000 and a running speed of the outer periphery of the stone of 5,000 m/min was used for cutting the slider block at a cutting rate of 1 mm/sec. Thereafter, the slider 7 was subjected to a high temperature/high humidity test where the slider 7 was left for 24 hours in ambient air having temperature of 80° C. and relative humidity of 90%. The specimen showed a low rate of particle separation of approximately 0.6%. A control specimen was included, which had been prepared according to the conventional manner, and showed a rate of particle separation of 51.5%. Therefore, it is evident that the method according to the present invention has the effect of suppressing generation of separated particles from a magnetic head. This effect is due to the heat treatment effects on the microcracks formed at the time the material block 1 was cut into the slider block 2. Almost all the potential particles that could have separated in the later manufacturing had been separated from the slider 7 during the heat treatment. Furthermore ensuring the cut surfaces of the slider 7 had a coarseness of not greater than 1 μm·Rmax, did effectively prevent generation of any additional microcracks and separated particles.

It should be noted that, while in the above example the heat treatment is carried out after formation of the negative pressure grooves 6, the method according to the present invention is not limited to that and a satisfactory effect may be achieved by conducting a heat treatment immediately after cutting a material block to from a slider block. Similarly it should be noted that while the present invention has been described for a monolithic type magnetic head made of sintered ferrite, it is not limited thereto and the method of the present invention is applicable to manufacturing a ceramic slider which is used for preparation of a film magnetic head or one which is used for preparation of a composite type magnetic head.

As is apparent from the above description, the present invention provides a method of manufacturing a magnetic head comprising a step of machining in parallel a number of sliders formed by cutting a slider block made of ceramic block material and a step of cutting said block to produce a plurality of magnetic head sliders, wherein said slider block is heated for 3 to 20 hours under a condition of temperature of 100° to 150° C., ambient air pressure of 1.5 to 5 kg/cm$^2$ and relative humidity of not less than 60% and by using a grindstone having a granularity of No. 1,000 to 3,000, which is revolved with a running speed of its outer periphery of 3,000 to 10,000 m/min, to cut the slider block to produce a plurality of magnetic head sliders, each of the magnetic head sliders is practically free from microcracks throughout its top layer thereby avoiding any separation of particles.

What is claimed is;

1. A process for manufacturing magnetic head sliders comprising the steps of:
    separating a block of material comprised of sintered ferrite into a core block portion and a slider block portion;
    heat treating said core block portion and said slider block portion for a minimum of three hours at a temperature of at least 40° C., at an ambient air pressure of at least 1.5 Kg/cm$^2$ and at a relative humidity equal to or greater than 60%;
    processing said core block portion to form a head core and coupling said head core to said slider block portion such that a portion of said head core is separated from said slider block portion by an insulating material to form a magnetic gap; and
    shaping the coupled slider block portion and associated head core to produce a magnetic head slider.

2. A process according to claim 1, wherein the air pressure used during said heat treating step is in the range from 1.5 Kg/cm$^2$ to 5 Kg/cm$^2$.

3. A process according to claim 2, wherein said heat treating step is conducted for a duration of from three to twenty hours.

4. A process according to claim 3, wherein the magnitude of the temperature during said heat treating is selected to be in the range of from 100° C. to 150° C.

5. A process for manufacturing magnetic head sliders comprising the steps of:
    providing a slider block comprised of sintered ferrite material;
    providing a plurality of head cores comprised of sintered ferrite material, said head cores having first and second ends;
    coupling said plurality of head cores, in spaced apart relationship, to an edge of said slider block such that said first ends are spaced from said edge of said slider block by a dielectric material to form a gap;
    forming one pair of grooves in a face of said slider block for each of said plurality of head cores, said pair of grooves straddling said first end of its associated head core; and
    heat treating said coupled grooved slider block and plurality of head cores for a minimum of three hours at a temperature of at least 40° C., at an ambient air pressure of at least 1.5 Kg/cm$^2$ and at a relative humidity equal to or greater than 60%.

6. A process according to claim 5, wherein said heat treating step is followed by the step of cutting said slider block to form a plurality of magnetic head sliders.

7. A process according to claim 6, wherein said cutting step is performed using a grindstone, having a granularity in the range of from No. 1,000 to 3,000, rotating such that its outer periphery is moving at a speed of from 3,000 to 10,000 m/min.

8. A process according to claim 7, wherein the air pressure used during said heat treating step is in the range from 1.5 Kg/cm$^2$ to 5 Kg/cm$^2$.

9. A process according to claim 8, wherein said heat treating step is conducted for a duration of from three to twenty hours.

10. A process according to claim 9, wherein the magnitude of the temperature during said heat treating is selected to be in the range of from 100° C. to 150° C.

11. A process for manufacturing a magnetic head comprising the steps of:
  separating a block of material comprised of sintered ferrite into a first member and a second member;
  heating treating said first member and said second member for a minimum of 3 hours, at a temperature of at least 40° C., at an ambient air pressure of at least 1.5 kg/cm$^2$ and at least 60% relative humidity;
  processing said heat treated first member to form a head core member; and
  coupling said head core member to said heat treated second member to form a magnetic head such that a portion of said head core member is separated from said second member by an insulating material to form a magnetic gap.

12. A process according to claim 11, wherein the air pressure used during said heat treating step is in the range from 1.5 Kg/cm$^2$ to 5 Kg/cm$^2$.

13. A process according to claim 12, wherein said heat treating step is conducted for a duration of from three to twenty hours.

14. A process according to claim 13, wherein the magnitude of the temperature during said heat treating is selected to be in the range of from 100° C. to 150° C.

15. A process for manufacturing magnetic heads comprising the steps of:
  separating a block of material comprised of sintered ferrite into a first member and a second member;
  processing said first member to form a head core;
  coupling said head core to said second member to form a magnetic head such that a portion of said head core member is separated from said second by an insulating material to form a gap; and
  heating treating said magnetic head for a minimum of 3 hours, at a temperature of at least 40° C., at an ambient air pressure of at least 1.5 kg/cm$^2$ and at least 60% relative humidity.

16. A process according to claim 15, wherein said heat treatment step is followed by the step of cutting said magnetic head to form a plurality of magnetic heads.

17. A process according to claim 16, wherein said cutting step is performed using a grindstone, having a granularity in the range of from No. 1,000 to 3,000, rotating such that its outer periphery is moving at a speed of from 3,000 to 10,000 m/min.

18. A process according to claim 17, wherein the air pressure used during said heat treating step is in the range from 1.5 Kg/cm$^2$ to 5 Kg/cm$^2$.

19. A process according to claim 18, wherein said heat treating step is conducted for a duration of from three to twenty hours.

20. A process according to claim 19, wherein the magnitude of the temperature during said heat treating is selected to be in the range of from 100° C. to 150° C.

21. A process according to claim 1, wherein said step of heat treatment occurs after the step of shaping the coupled slider block portion and associated head core.

* * * * *